Patented Nov. 7, 1944

2,362,357

UNITED STATES PATENT OFFICE 2,362,357

METHOD FOR TREATMENT OF SUGAR LIQUORS

Arthur B. Cummins, Millington, N. J., assignor to Johns-Manville Corporation, New York, N. Y., a corporation of New York No Drawing. Application August 20, 1941, Serial No. 407,671

5 Claims. (Cl. 127—55)

This application relates to a new filtering and decolorizing medium for sugar solutions and to the process of producing and using the same. It relates especially to a composition and procedure of filtering sugar liquors in which the combination of diatomaceous earth and an alkaline phosphate are used to obtain rapid filtration of the sugar liquor through the filter and a very high degree of clarification.

It has heretofore been well-known to use phosphates such as calcium phosphate as defecants in the refining of sugar. For example, in the refining of cane sugar, calcium phosphate has been employed for many years in conjunction with bag filters of different designs and is still so used to a certain extent. In the general procedure of using phosphoric acid in sugar refinery work ordinarily followed, phosphoric acid is first added to the impure sugar solution. Calcium hydroxide is then added as milk of lime in a sufficient amount to neutralize the phosphoric acid and precipitate the same as tri-calcium phosphate. The thus-formed precipitate comes down as a voluminous flocculent precipitate which tends to occlude and trap and otherwise serves to remove some of the colloidal or finely-divided impurities which are characteristic of unrefined sugars. The combined calcium phosphate and impurities must then be separated from the defecated solution, which is ordinarily accomplished by mechanical means, such as settling, flotation and/or filtration.

It is difficult, however, to obtain a complete separation of the calcium phosphate floc since the precipitate has troublesome characteristics. In the attempt to separate a calcium phosphate floc from the defecated sugar solution, the fine floc-like material has a tendency to pass through most filter mediums at the start of the filtration, thus giving a cloudy and turbid filtrate and incomplete removal of impurities. Furthermore, as the filtration progresses, the rate of flow becomes slower and slower, and when totally brilliant or clear filtrates are obtained, the rate of filtration is generally too slow and unsatisfactory. In addition, other troublesome factors, such as inversion losses and bacterial growths, are usually encountered. As a result of the above-described difficulties, the use of calcium phosphate for the handling of washed raw sugar liquors in refineries has been largely supplanted by other processes.

Diatomaceous earth has also been used to a broad degree as a filter aid for raw sugar liquors, but when so used, diatomaceous earth has little or no defecation properties. The diatomaceous earths heretofore used as filter aids in the sugar industry are the standard and conventional types now found on the market and necessarily have a high percentage of fine particles in order to obtain satisfactory separation of suspended materials. The conventional diatomaceous earth filter aids referred to consist of particles of which more than about 40 to 50% are 10 microns or finer in size. It will be evident that as a result of the very fine particles contained in the filter aids, the rate of filtration therethrough of any sugar liquors will be relatively slow. Thus, if any calcium phosphate flocs were intended to be used with the conventional diatomaceous earth filter aids, the pores and openings in the filter cake would plug or close and reduce the rate of filtration of the materials therethrough, thus making the operation too slow and uneconomical.

Heretofore, it has been considered impossible to employ coarser filter aids in which more than about 50% to 60% of the particles are coarser than 10 microns in size, since even though the sugar liquors would tend to pass through the filter at a relatively high flow rate, the degree of clarification obtained with these faster flow rate filter aids is not acceptable. It is, therefore, an object of this invention to combine fast flow rate filter aids in which the preponderance of the particles in the diatomaceous earth filter aid are more than 10 microns in size. It is also an object of this invention to use a substantially insoluble phosphate in combination with the coarse filter aid and obtain a very high degree of clarification and a high flow rate of the sugar liquor through the filtering medium. It is also an object of this invention to so regulate and control the alkalinity of the sugar liquor and filtering medium in order to avoid undue inversion of the sugar in the solution and to secure the maximum filtration rate consistent with a high degree of clarification.

The filtering and clarification composition used in the present invention is preferably prepared by adding phosphoric acid to the sugar liquor, followed by the addition of lime in sufficient quantity to react with the added phosphoric acid to form calcium phosphate. An excess of lime is usually added in order to raise the alkalinity of the solution preferably within the range of 7.0 to 7.6 pH. If the pH of the solution is raised greatly in excess of 7.6, less satisfactory clarification and a lower rate of filtration, as well as less color removal from the sugar solution, will result.

After the lime has been added to the liquor, it should be heated to about 80° to 90° C. and time allowed for the phosphate floc formation. This depends to a great degree on the impurities in the sugar and the amount of phosphoric acid and lime used. For average sugars, the diatomaceous earth is added preferably in amounts varying up to about .5% based on the solids in the sugar liquor, and the materials are allowed to settle in the liquor. The sugar liquor is then filtered through the thus-formed cake.

Other metallic compounds adapted to react with phosphoric acid to form a substantially insoluble metallic phosphate floc may be used in place of lime. Another metallic compound may be for example a soluble salt of aluminum. It is important that the precipitated phosphate be in the form of relatively large floc. Thus, any metallic compound that will form a satisfactory and substantially water insoluble phosphate floc but will not react with or contaminate the sugar solution may be used in place of the lime described above.

In the filtration and clarification experiments disclosed herein to illustrate my invention, various types of diatomaceous earth powders or filter aids were used. The particle size of the different diatomaceous earth products used were as follows:

| Particle size | A | B | C | D |
|---|---|---|---|---|
| | Percent | Percent | Percent | Percent |
| Coarser than 20 microns | 11.7 | 10 | 35 | 52.5 |
| 20 to 10 microns | 19.3 | 20 | 35.5 | 34.5 |
| 10 to 4 microns | 43.0 | 50.5 | 17.5 | 13.0 |
| Finer than 4 microns | 26.0 | 19.5 | 2.0 | Trace |

Diatomaceous earths A and B are the conventional or standard type filter aids heretofore used in ordinary filtration operations, and it will be noted that the greater portion of the particles are less than 10 microns in size. The diatomaceous earths C and D contain particles of which more than 60% are larger than 10 microns in size, and it has been found that if diatomaceous earths of this type are used in the processes herein described, satisfactory or superior clarification and high rate of filtration will be obtained. On the other hand, when these types of filter aids are employed without the benefit of calcium phosphate floc, as described herein, it has been found impossible to secure a degree of clarification which is considered to be satisfactory for the commercial refining of sugar. If diatomaceous earth containing more than 60% of the particles larger than 10 microns is used in combination with varying proportions of water insoluble metallic phosphate flocs, especially calcium phosphate, to filter sugar liquors, increased rate of flow and equal clarification, or equal rate of flow and superior clarification, or faster flow rate and better clarity are obtained as compared to the flow rate and clarification of the liquor when using the older type filter aids as illustrated under A and B. Improved color removal is also obtained in conjunction with the numerous advantages pointed out herein in connection with the present invention. These advantages will be more clearly set forth in the examples given below.

In the case of readily filterable washed raw sugar, the following results were obtained:

EXAMPLE I

Comparisons of filtrations with standard filter aids and with fast flow rate filter aids and added calcium phosphate

| | Diatomaceous earths | | | | | |
|---|---|---|---|---|---|---|
| | A | B | C | | | D |
| | No phosphate | No phosphate | .002% $P_2O_5$ | .0045% $P_2O_5$ | .008% $P_2O_5$ | .0045% $P_2O_5$ |
| Filtration rate, gal./sq. ft./1 hr.: | | | | | | |
| First 30 minutes of 4 hour run | 6.92 | 15.62 | 18.92 | 13.46 | 7.52 | 16.70 |
| Last 30 minutes of 4 hour run | 3.87 | 9.11 | 6.96 | 6.92 | 4.04 | 8.42 |
| Average of 4 hours | 5.52 | 11.42 | 11.95 | 8.90 | 5.40 | 11.83 |
| Clarity (foot candles): | | | | | | |
| First 30 minutes of 4 hour run | 4.78 | 8.11 | 6.67 | 3.30 | 2.88 | 3.54 |
| Last 30 minutes of 4 hour run | 3.23 | 4.02 | 2.84 | 2.66 | 2.59 | 2.81 |
| Average of 4 hours | 3.70 | 5.14 | 4.35 | 2.78 | 2.67 | 2.98 |
| Color removal per cent | 0 | 0 | 17 | 27 | 33 | 26–27 |

It will be noted that in the tests where the conventional filter aids A and B were used, no color was removed in either case, but in the experiments where the coarser filter aids C and D were used in conjunction with various percentages of $P_2O_5$, a substantial quantity of color was removed from the sugar liquor. Color was removed even though the filtration rates were relatively high and satisfactory for commercial operation. Color is due primarily to dissolved substances which are not removed to any substantial degree by ordinary filtration.

Furthermore, the clarity of the filtered sugar liquor is greatly improved, which is one of the very important advantages of the present invention when considered with the high flow rate. Clarification as used herein is the removal of colloidal impurities and turbidity-producing substances by ordinary filtration.

In studying the data of Example I more specifically, it teaches that with filter acid C used in conjunction with .002% $P_2O_5$, an average flow rate of 11.95 gallons per square foot per hour was obtained. This flow rate is about the same as the flow rate of filter aid B without phosphate (11.42 gallons per square foot per hour). It will be noted, however, that with filter aid C used in conjunction with phosphate, a clarity reading of 4.35 foot candles was obtained; while, on the other hand, the clarity resulting with filter aid B without the use of a phosphate was 5.14 foot candles. The improved clarity through the use of filter aid C in conjunction with the phosphate as compared to the clarity through the use of filter aid B without the phosphate is technically very important. In addition to the improved clarity and other advantages, a considerable portion of color was removed; that is, 17% of color was removed by using filter aid C in conjunction with the phosphate.

Similarly, when filter aid C was employed with .0045% $P_2O_5$, a flow rate of 8.90 gallons per square foot per hour was obtained, which was about 50% greater than the flow rate of 5.52 gallons per square foot per hour obtained with filter aid A without the advantage of the phosphate. This is a substantial increase in filtration rate in favor of the coarse filter aid C plus phosphate. It will be further noted that at the same time the clarity for filter aid C plus phosphate is 2.78 foot candles, while, on the other hand, the clarity for filter aid A without the use of a phosphate is 3.70 foot candles. In addition to the improved rate of filtration and clarity, 27% of color was removed from the sugar liquor as compared to no color removal when using filter aid A with no phosphate.

Another washed raw sugar sample of average filterability was tested and the following results were obtained:

per square foot per hour through filter aid A with no $P_2O_5$. Even though the rate of filtration of the sugar liquors through the different diatomaceous earth materials were substantially the same, it will be noted that the average clarity of the sugar liquor passing through filter aid C and the $P_2O_5$ was 4.25 foot candles as compared to the clarity reading of 5.41 foot candles for the sugar liquor passing through filter aid A with no $P_2O_5$. In addition to the improved clarification of the sugar liquor, 33% of color was removed from the sugar liquor passing through filter aid C and the $P_2O_5$ as compared to no color removal of the sugar liquor passing through diatomaceous earth A and no $P_2O_5$.

It has been found that if diatomaceous earths of the following approximate particle size distribution:

Coarser than 20 microns_____ More than 27%
20 to 10 microns_____ More than 34%
10 to 4 microns_____ Less than 34%
Finer than 4 microns_____ Less than 5%

EXAMPLE II

*Comparison of filtrations with standard filter aids and with fast flow rate filter aids and added calcium phosphate*

|  | Diatomaceous earths | | | | | |
|---|---|---|---|---|---|---|
|  | A | B | C | | | D |
|  | No $P_2O_5$ | No $P_2O_5$ | .002% $P_2O_5$ | .0045% $P_2O_5$ | .008% $P_2O_5$ | .0045% $P_2O_5$ |
| Filtration rate, gal./sq. ft./hr.: | | | | | | |
| First 30 minutes of 4 hour run | 5.59 | 9.25 | 10.10 | 7.91 | 5.68 | 13.75 |
| Last 30 minutes of 4 hour run | 2.71 | 4.39 | 4.17 | 3.01 | 2.02 | 6.10 |
| Average of 4 hrs | 3.82 | 6.38 | 6.44 | 4.74 | 3.29 | 8.95 |
| Clarity (foot candles): | | | | | | |
| First 30 minutes of 4 hour run | 6.08 | 6.82 | 5.61 | 4.72 | 4.51 | 5.30 |
| Last 30 minutes of 4 hour run | 5.24 | 5.24 | 4.67 | 4.21 | 4.06 | 4.21 |
| Average of 4 hrs | 5.41 | 5.62 | 4.99 | 4.43 | 4.25 | 4.49 |
| Color removal_____per cent__ | 0 | 0 | 15 | 24 | 33 | 26 |

In the data of the second example, it will be noted that color was removed when coarse diatomaceous earth was used in conjunction with calcium phosphate, calculated as $P_2O_5$, whereas no color was removed in the tests where conventional diatomaceous earth filter aids A and B were used without the benefit of the alkaline phosphate floc. In addition, in the cases where coarser filter aids C and D were used, the rate of filtration was higher than the rate of filtration through the heretofore conventional filter aids and the improved rate of filtration was accompanied by improved clarification.

In analyzing the data shown in Example II more specifically, it will be noted that with filter aid C used in conjunction with .002% $P_2O_5$, an average flow rate of 6.44 gallons per square foot per hour was obtained as compared to an average flow rate of 6.38 gallons per square foot per hour through filter aid B with no $P_2O_5$. The average clarification obtained with filter aid C used in conjunction with $P_2O_5$ was 4.99 foot candles as compared to the clarity of 5.62 foot candles obtained by using filter aid B without the advantage of $P_2O_5$. In addition to the improved filtration rate and clarification, 15% of color was removed from the sugar liquor.

When filter aid C was used in conjunction with .008% $P_2O_5$, an average flow rate of 3.29 gallons per square foot per hour was obtained as compared to an average filtration rate of 3.82 gallons are used in conjunction with an alkaline phosphate floc, such as calcium phosphate floc, satisfactory results in removing color and also high rate of filtration together with superior clarification will be obtained. If the diatomaceous earth used in the present operations contains particles of which 95% are coarser than 4 microns, excellent results will be obtained.

In filtering sugar liquors through coarse diatomaceous earth and calcium phosphate floc, it is preferred that the pH of the solution be regulated between 7.0 and 7.6. In comparing the effect of the pH in the filtrations of washed raw sugar through coarse diatomaceous earth C and calcium phosphate floc on sugar liquors used in the Example I described above, the following results were noted:

| Initial pH | 7.2 | 7.6 | 7.9 |
|---|---|---|---|
| Filtration rate, gal./sq. ft./1 hr.: | | | |
| First 30 minutes of test | 7.23 | 6.62 | 6.01 |
| Last 30 minutes of test | 3.61 | 2.58 | 2.62 |
| Average | 5.34 | 4.39 | 4.11 |
| Filtration rate (percent vs. pH 7.2) percent__ | 100 | 82 | 77 |
| Clarity (foot candles): | | | |
| First 30 minutes of test | 3.23 | 3.75 | 3.93 |
| Last 30 minutes of test | 2.81 | 3.34 | 3.42 |
| Average | 2.99 | 3.56 | 3.67 |
| Final pH | 7.0 | 7.5 | 7.7 |
| Color removal_____percent__ | 30 | 27 | 21 |

The above data illustrating the effect of the pH on the rate of filtration and clarity indicates that it is preferable to maintain the pH at approximately 7.2 in order to obtain the optimum rate of filtration, clarification and color removal. If the pH tends to fall below 7.0, the rate of filtration and color removal will tend to increase, but this increase is accompanied by inversion of a considerable proportion of the sugar which is an undesirable feature. Thus, for the most economical and satisfactory operations, the pH of the solution should be held at about 7.2.

Throughout the filtering operations, it is desirable to keep the calcium phosphate floc or any other metallic phosphate floc in large particles and in order to obtain these results, it is desirable to avoid undue agitation of the solution. In recycling the sugar filtrate, the pumping action should be of such a nature that the floc will not tend to be broken down to such a degree that it will not settle from the solution. In the experiments it has been found that such pumps as positive displacement plunger pumps cause less break-down of the floc than a centrifugal pump. It has also been found that a low pressure high volume centrifugal pump will affect the floc less than a high pressure centrifugal pump. It is thus desirable that the agitation from the pumping action be relatively mild in order to avoid breaking down the floc material. When the floc material has been broken down, it becomes too finely dispersed in the sugar liquor and will not tend to settle and will thus be unsatisfactory. If, however, the floc has not been broken down to such a degree that it will settle, it may be used for further filtration and clarification operations. Slow speed pumps are recommended in the operations for the filtration and clarification work of the present invention, and high speed impeller type pumps and similar types should be avoided.

The amount of calcium phosphate floc that may ordinarily be used with satisfactory results has been found to range between 0.003 to 0.015%, calculated as $P_2O_5$. In some unusual cases, larger quantities up to .05% $P_2O_5$, based on the Brix solids in the sugar solution, may be employed. In some plant operations it was found that the minimum quantity used should be .006% $P_2O_5$ based on the sugar solids, and the maximum .015% $P_2O_5$ on sugar solids. Lesser quantities of $P_2O_5$ may be satisfactorily used in the operation in some instances as indicated in the examples given above. However, even though the rate of filtration may be increased through the use of a lower percentage of $P_2O_5$, the clarity and the amount of color removed from the sugar liquor will be decreased.

The filtration rates in the examples were determined by laboratory bomb test procedure. The color removal may be determined by any one of the well-known established colorimetric methods. The clarity was determined by the photometric examination of the filtrates with an accurate Tyndallmeter as described in Cummins, Badollet and Miller Patent No. 2,045,124, granted June 23, 1936. Foot candle readings refer to the light intensity of the Tyndall beams produced in the liquids and represent the amount or degree of turbidity contained therein; the lower the foot candle reading, the greater the degree of clarification.

The particle sizes in microns of the various diatomaceous earth materials referred to herein were determined and calculated from tests by the Oden sedimentation method. This method is described in The Svedberg's "Colloid Chemistry," pages 136–146 (A. C. S. monograph).

Having thus described my invention in rather full detail, it will be understood by those skilled in the art that these details need not be strictly adhered to, but that various changes and modifications will suggest themselves without departing from the scope of my invention as defined by the subjoined claims.

What I claim is:

1. The process of treating sugar liquors to obtain simultaneous rapid filtration and substantial clarification of the liquor, which comprises passing the liquor through a filter containing particles of finely divided diatomaceous earth having a particle size classification of more than 27% coarser than 20 microns, more than 60% coarser than 10 microns, and less than 5% finer than 4 microns, and a substantially water insoluble metallic phosphate floc, the metallic phosphate floc being present in the amount of .002% to .05% expressed as $P_2O_5$, based on solids in the sugar liquor.

2. The process of treating sugar liquors to obtain simultaneous rapid filtration, high degree of clarification of the liquor, and color removal, which comprises, forming in the liquor a flocculent inorganic phosphate precipitate, adding finely-divided diatomaceous earth having a particle size classification of more than 27% coarser than 20 microns, more than 60% coarser than 10 microns and less than 5% finer than 4 microns, filtering the suspension thus formed, and maintaining the pH of the liquor passing through the filter within the range 7–7.6.

3. The process of treating sugar liquors to obtain simultaneous rapid filtration, high degree of clarification of the liquor, and color removal, which comprises, adding to the liquor a flocculent inorganic phosphate precipitate in amount representing .003–.15%, $P_2O_5$ equivalent, based on the solids content of the liquor, also adding finely divided diatomaceous earth having a particle size classification of more than 27% coarser than 20 microns, more than 60% coarser than 10 microns, and less than 5% finer than 4 microns, and filtering the suspension thus formed.

4. The process of treating sugar liquors to obtain simultaneous rapid filtration, a high degree of clarification of the liquor, and color removal, which comprises, forming in the liquor a flocculent metallic phosphate precipitate of .003–.015% $P_2O_5$ equivalent based on the solids content of the liquor, adding to the liquor finely divided diatomaceous earth having a size classification of more than 27% coarser than 20 microns, more than 60% coarser than 10 microns, and less than 5% finer than 4 microns, and filtering the suspension thus formed.

5. The process of treating sugar liquors to obtain simultaneous rapid filtration, a high degree of clarification of the liquor, and color removal, which comprises, adding to the liquor calcium hydroxide and phosphoric acid in amounts proportioned to develop a flocculent calcium phosphate precipitate having a $P_2O_5$ equivalent of .002–.05% by weight of the liquor solids, also adding to the liquor up to .5% of the liquor solids of finely divided diatomaceous earth having a size classification of 27%–52% coarser than 20 microns, 60%–87% coarser than 10 microns and less than 5% finer than 4 microns, and maintaining the pH of the liquor within the range 7.0–7.6 while filtering the liquor through the mixture of diatomaceous earth and insoluble calcium phosphate precipitate.

ARTHUR B. CUMMINS.